(12) United States Patent
Pai et al.

(45) Date of Patent: Sep. 14, 2004
(10) Patent No.: US 6,791,850 B2

(54) DC-TO-AC POWER INVERTER AND METHOD OF OPERATION THEREOF

(75) Inventors: Fu-Sheng Pai, Tainan (TW); Ming-Tsung Tsai, Tainan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 10/278,427

(22) Filed: Oct. 23, 2002

(65) Prior Publication Data

US 2003/0123268 A1 Jul. 3, 2003

(30) Foreign Application Priority Data

Oct. 23, 2001 (TW) .......................... 90126201 A
Nov. 19, 2001 (TW) .......................... 90128623 A

(51) Int. Cl.[7] .......................... H02M 5/458; H02M 3/24
(52) U.S. Cl. .......................... 363/37; 363/98; 363/132
(58) Field of Search .......................... 363/131, 132, 363/98, 97, 71, 72, 74, 95, 37, 39; 323/282–285

(56) References Cited

U.S. PATENT DOCUMENTS 4,947,310 A * 8/1990 Kawabata et al. ............ 363/71
5,442,538 A * 8/1995 Ikeda et al. ................... 363/95

* cited by examiner

Primary Examiner—Rajnikant B Patel
(74) Attorney, Agent, or Firm—Volpe and Koenig, P.C.

(57) ABSTRACT

A DC-to-AC power inverter includes an input port, an output port, a switching circuit, and a system controller. The switching circuit is electrically connected between the input port and the output port responsive to control signals to convert a DC voltage at the input port to an AC output voltage. The system controller senses the AC output voltage at the output port and transforms the AC output voltage to generate a first reference current signal. Furthermore, the system controller senses an output current at the output port to generate an output current signal. Moreover, the system controller senses a reference current signal by adding the first reference current signal to the output current signal. Finally, the system controller generates the control signals responsive to the reference current signal and a sensed inverter current signal by sensing an inverter current at the switching circuit. The related methods are also discussed.

6 Claims, 4 Drawing Sheets

DC-TO-AC POWER INVERTER AND METHOD OF OPERATION THEREOF

FIELD OF THE INVENTION

The present invention relates to a DC-to-AC power inverter and a method of operation for the DC-to-AC power inverter, and more particular to those applied to DC-to-AC power inverters.

BACKGROUND OF THE INVENTION

DC-to-AC power inverters are commonly used in equipment such as uninterruptible power supplies (UPSs), motor drives, and other applications. Conventional DC-to-AC power inverters use a pulse width modulated technique to stabilize the output voltage thereof. Please refer to FIG. 1 which is a schematic diagram illustrating a DC-to-AC power inverter according to the prior art. As shown FIG. 1, the DC-to-AC power inverter 100 includes a switching circuit 101, a RMS voltage calculation module 102, a summing module 103, a voltage control module 104, a phase lock loop 105, a multiplier module 106, and a voltage mode control circuit 107. Meanwhile, the voltage mode control circuit 107 operates the switching circuit 101 as a voltage controlled inverter. The voltage mode controller 108 is here shown as including a plurality of modules executing on a combination of a data processor (e.g., a microprocessor, digital signal processor (DSP), or combination thereof) and an associated memory. The modules include the RMS voltage calculation module 102 that computes an RMS voltage $V_{rms}$ from an output voltage $V_{out}$ sensed at the output port 109. The RMS voltage $V_{rms}$ is subtracted from a first reference voltage signal $V_{ref1}$ at a summing module 103 to determine a second reference voltage signal $V_{ref2}$. The second reference voltage signal $V_{ref2}$ is modulated by the voltage control module 104 to generate a third reference voltage signal $V_{ref3}$. The reference signal θ is processed by the phase lock loop 105 and multiplied by the third reference voltage signal $V_{ref3}$ in the multiplier module 106 to produce a computed reference voltage signal $V_{ref}$. Hence the voltage mode control circuit 107 responsive to the reference voltage signal $V_{ref}$ and the output voltage $V_{out}$ operates the switching circuit 101 as a voltage controlled inverter.

Generally speaking, there are some drawbacks in the typical parallel operation of an uninterruptible power supply system to be described as follows:

(1) Computationally intensive operations, such as RMS voltage calculations, need a complex circuit or expensive circuit, such as the DSP chip to implement the calculation.

(2) On the other hand, the DC-to-AC power inverter needs a multiplier module to perform the voltage command signal calculation. It will exhaust a great amount of hardware resources to perform the voltage command signal calculation, whether it is implemented by digital signal processing architectures or corresponding analog signal processing architectures.

It is therefore attempted by the applicant to deal with the above situation encountered with the prior art.

SUMMARY OF THE INVENTION

It is therefore an object of the present invention to propose a DC-to-AC power inverter and a method of operation for the DC-to-AC power inverter to reduce computationally intensive operations, such as RMS voltage calculations and multiplication calculations.

According to an aspect of the present invention, a DC-to-AC power inverter includes an input port, an output port, a switching circuit electrically connected between the input port and the output port responsive to control signals to convert a DC voltage at the input port to an AC output voltage, and a system controller for sensing the AC output voltage at the output port and transforming the AC output voltage to generate a first reference current signal, for sensing an output current at the output port to generate an output current signal, for generating a reference current signal by adding the first reference current signal to the output current signal, and for generating the control signals responsive to the reference current signal and a sensed inverter current signal by sensing an inverter current at the switching circuit.

Preferably, the system controller includes a inverter current sensor coupled to the switching circuit for sensing the inverter current at the switching circuit to generate the inverter current signal, an output current sensor for sensing the output current at the output port to generate the output current signal, a voltage control circuit coupled to the output port and the output current sensor for generating the reference current signal responsive to the output current signal and the sensed output voltage signal, and a current mode control circuit coupled to the voltage control circuit to generate the control signals responsive to the first reference current signal.

Preferably, the voltage control circuit includes a voltage sensor coupled to the output port for sensing the AC output voltage to generate the output voltage signal, a subtractor received the output voltage signal and a reference voltage signal for generating an error voltage signal by subtracting the output voltage signal from the reference voltage signal, a voltage controller coupled to the subtractor for transforming the error voltage signal to the first reference current signal, and an adder coupled to the voltage controller and the output current sensor for generating the reference current signal responsive to the first reference current signal and the output current signal.

According to another aspect of the present invention, a control method for a DC-to-AC power inverter, wherein the DC-to-AC power inverter comprises an input port, an output port, a switching circuit electrically connected between the input port and the output port responsive to control signals to convert a DC voltage at the input port to an AC output voltage, includes the steps of sensing the AC output voltage at the output port and transforming the AC output voltage to generate a first reference current signal, sensing an output current at the output port to generate an output current signal, generating a reference current signal by adding the first reference current signal to the output current signal, and generating the control signals responsive to the reference current signal and a sensed inverter current signal by sensing an inverter current at the switching circuit.

Preferably, the control method further includes the steps of sensing the inverter current at the switching circuit to generate the inverter current signal, sensing the output current at the output port to generate the output current signal, generating the first reference current signal responsive to the output current signal and the sensed output voltage signal, and generating the control signals responsive to the first reference current signal.

Preferably, the control method further includes the steps of sensing the AC output voltage to generate the output voltage signal, generating an error voltage signal by subtracting the output voltage signal from the reference voltage signal, transforming the error voltage signal to the first reference current signal, and generating the reference current signal responsive to the first reference current signal and the output current signal.

The present invention may best be understood through the following description with reference to the accompanying drawings, in which:

DETAILED DESCRIPTION OF THE PREFERRED EMBODIMENTS

Figure 1:
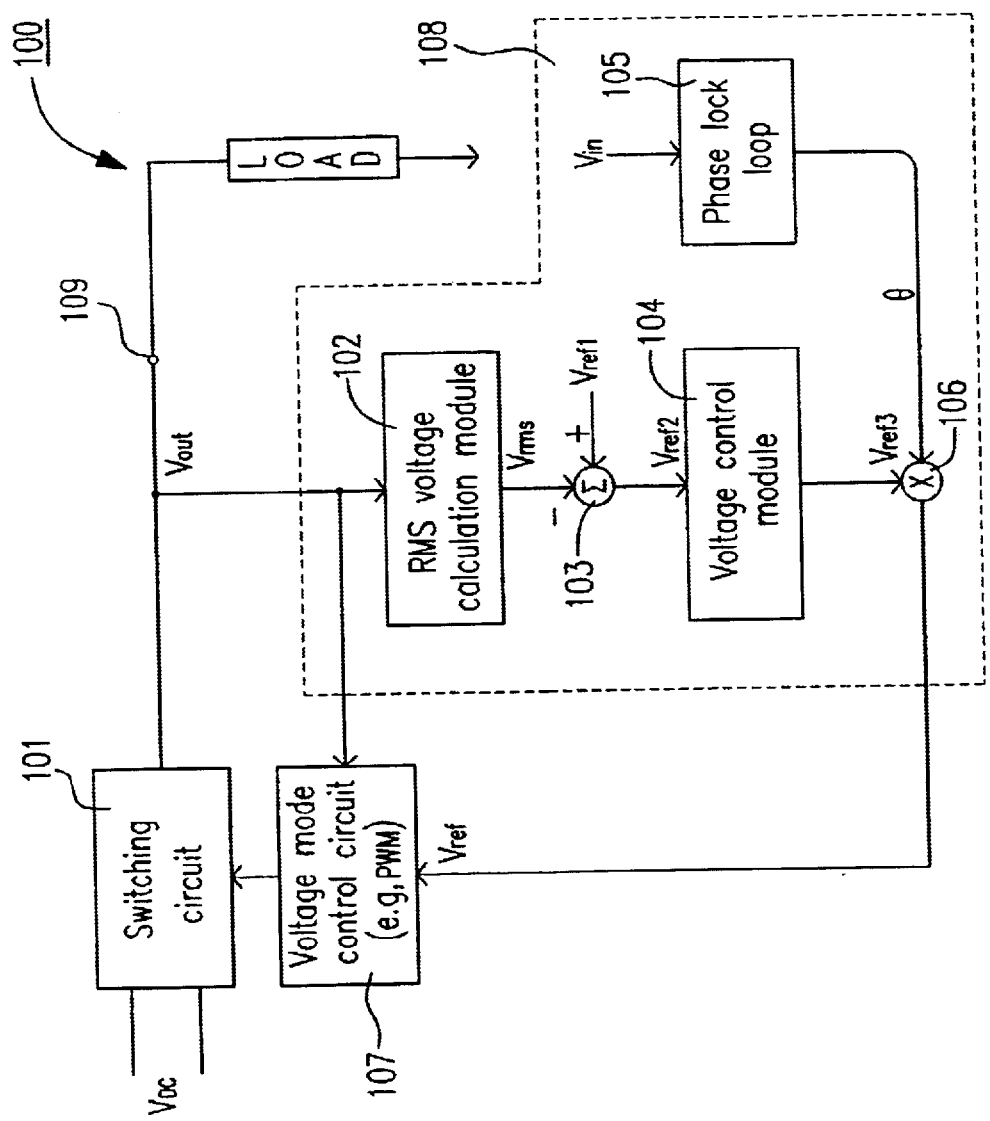
FIG. 1 is a schematic diagram illustrating a DC-to-AC power inverter circuit according to the prior art.
Figure 2:
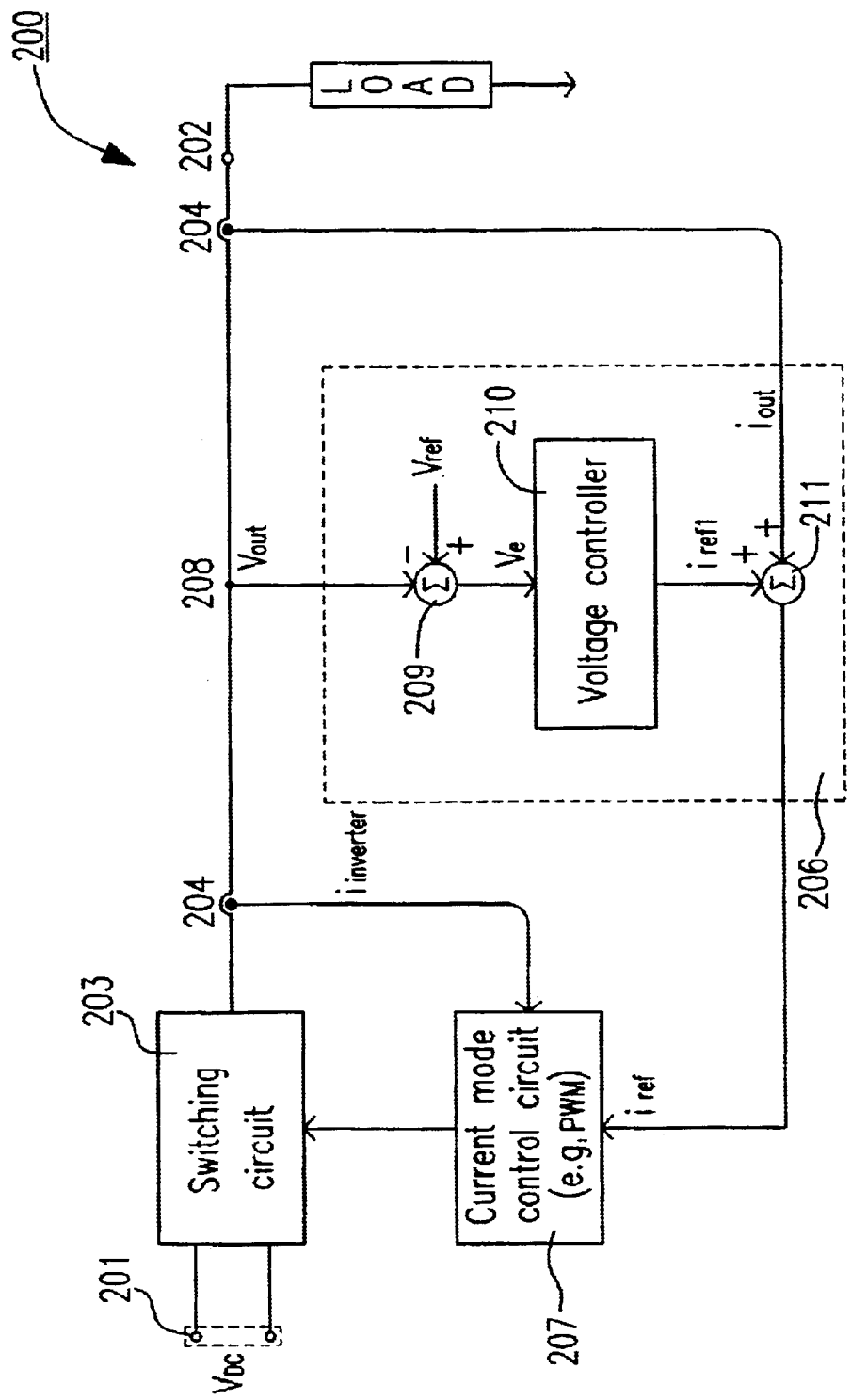
FIG. 2 is a schematic diagram illustrating a DC-to-AC power inverter circuit according to a preferred embodiment of the present invention.

FIG. 2 is a schematic diagram illustrating a DC-to-AC power inverter circuit according to a preferred embodiment of the present invention. As shown in FIG. 2, a DC-to-AC power inverter 200 includes an input port 201, an output port 202, a switching circuit 203, and a system controller. The switching circuit 203 is electrically connected between the input port 201 and the output port 202 responsive to control signals to convert a DC voltage $V_{dc}$ at the input port 201 to an AC output voltage 202. Meanwhile, the system controller senses the AC output voltage at the output port 202 and transforms the AC output voltage to generate a first reference current signal $i_{ref1}$. Furthermore, the system controller senses an output current at the output port 202 to generate an output current signal $i_{out}$. Moreover, the system controller generates a reference current signal $i_{ref}$ by adding the first reference current signal $i_{ref1}$ to the output current signal $i_{out}$. Finally, the system controller generates the control signals responsive to the reference current signal $i_{ref}$ and a sensed inverter current signal $i_{inverter}$ by sensing an inverter current at the switching circuit 203. Meanwhile, the sensed inverter current signal $i_{inverter}$ by sensing an inverter current at the switching circuit 203 can be instead of a sensed inductor current signal by sensing an inductor current at the output inductor-capacitor filter. (Not shown in figures)

In addition, the system controller includes an inverter current sensor 204, an output current sensor 205, a voltage control circuit 206, and a current mode control circuit 207. The inverter current sensor 204 is coupled to the switching circuit 203 for sensing the inverter current at the switching circuit to generate the inverter current signal $i_{inverter}$. The output current sensor 205 senses the output current at the output port to generate the output current signal $i_{out}$. The voltage control circuit 206 is coupled to the output port 202 and the output current sensor 205 for generating the reference current signal $i_{ref}$ responsive to the output current signal $i_{out}$ and the sensed output voltage signal $V_{out}$. And, the current mode control circuit 207 is coupled to the voltage control circuit 206 to generate the control signals responsive to the reference current signal.

Preferably, the voltage control circuit 206 includes a voltage sensor 208, a subtractor 209, a voltage controller 210, and an adder 211. The voltage sensor 208 is coupled to the output port 202 for sensing the AC output voltage to generate the output voltage signal $V_{out}$. The subtractor 209 receives the output voltage signal $V_{out}$ and a reference voltage signal $V_{ref}$ for generating an error voltage signal Ve by subtracting the output voltage signal $V_{out}$ from the reference voltage signal $V_{ref}$. The voltage controller 210 is coupled to the subtractor 209 for transforming the error voltage signal $V_e$ to the first reference current signal $i_{ref1}$. And, the adder 211 is coupled to the voltage controller 210 and the output current sensor 205 for generating the reference current signal $i_{ref}$ responsive to the first reference current signal $i_{ref1}$ and the output current signal $i_{out}$.

Figure 3A:
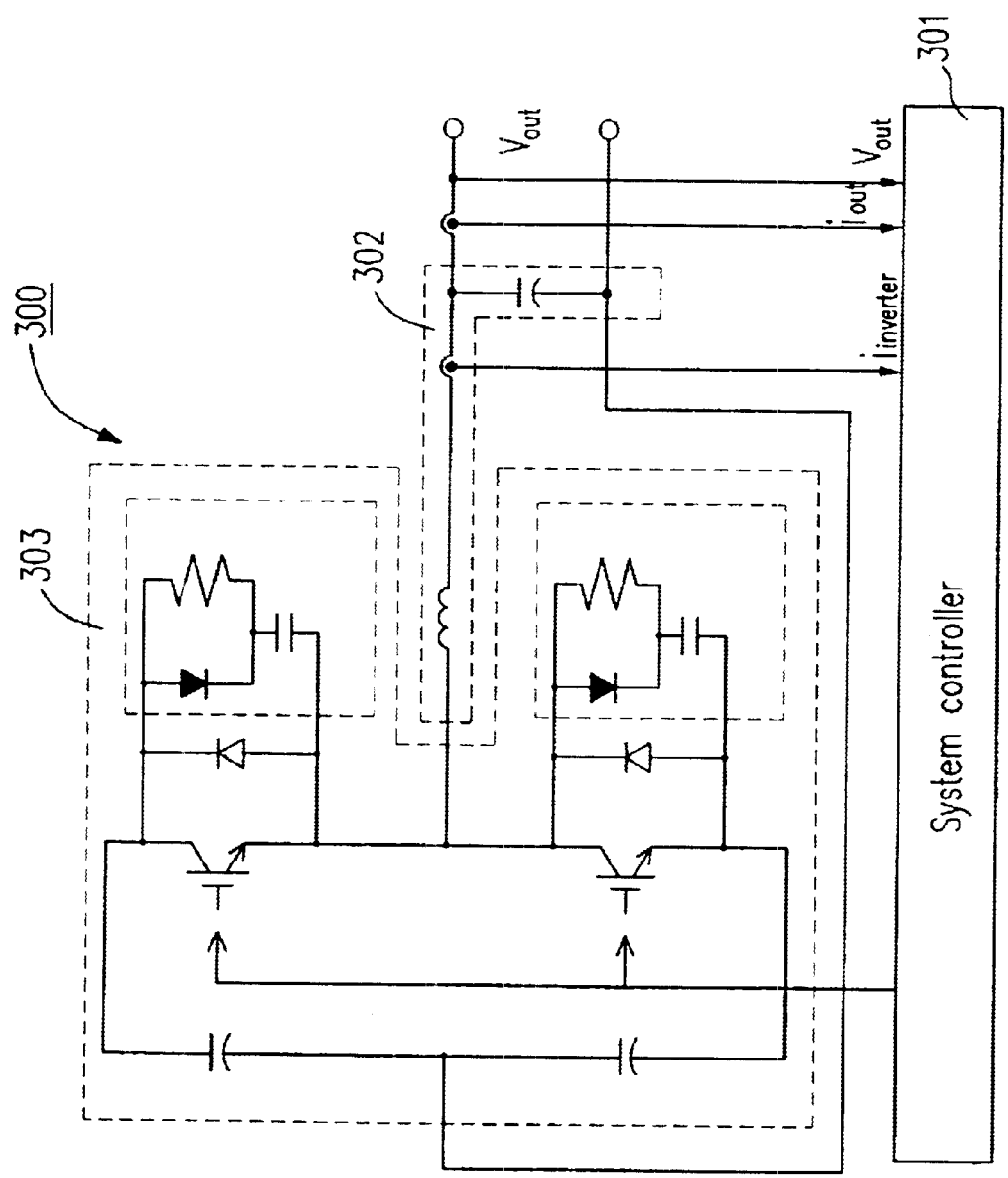
FIG. 3(a) is a schematic diagram illustrating a DC-to-AC power inverter according to a preferred embodiment of the present invention.

FIG. 3(a) is a schematic diagram illustrating a DC-to-AC power inverter according to a preferred embodiment of the present invention. As shown in FIG. 3(a), the DC-to-AC power inverter 300 includes the system controller 301, the inductor-capacitor filter 302, and the switching circuit 303. Actually, the system controller 301 includes a voltage control circuit and a current mode control circuit as mentioned above. The system controller 301 responsive to the output voltage $V_{out}$, the inductor current $i_{inductor}$ and the output current $i_{out}$ operates the switching circuit 303 to stabilize the output voltage of the power inverter.

Figure 3B:
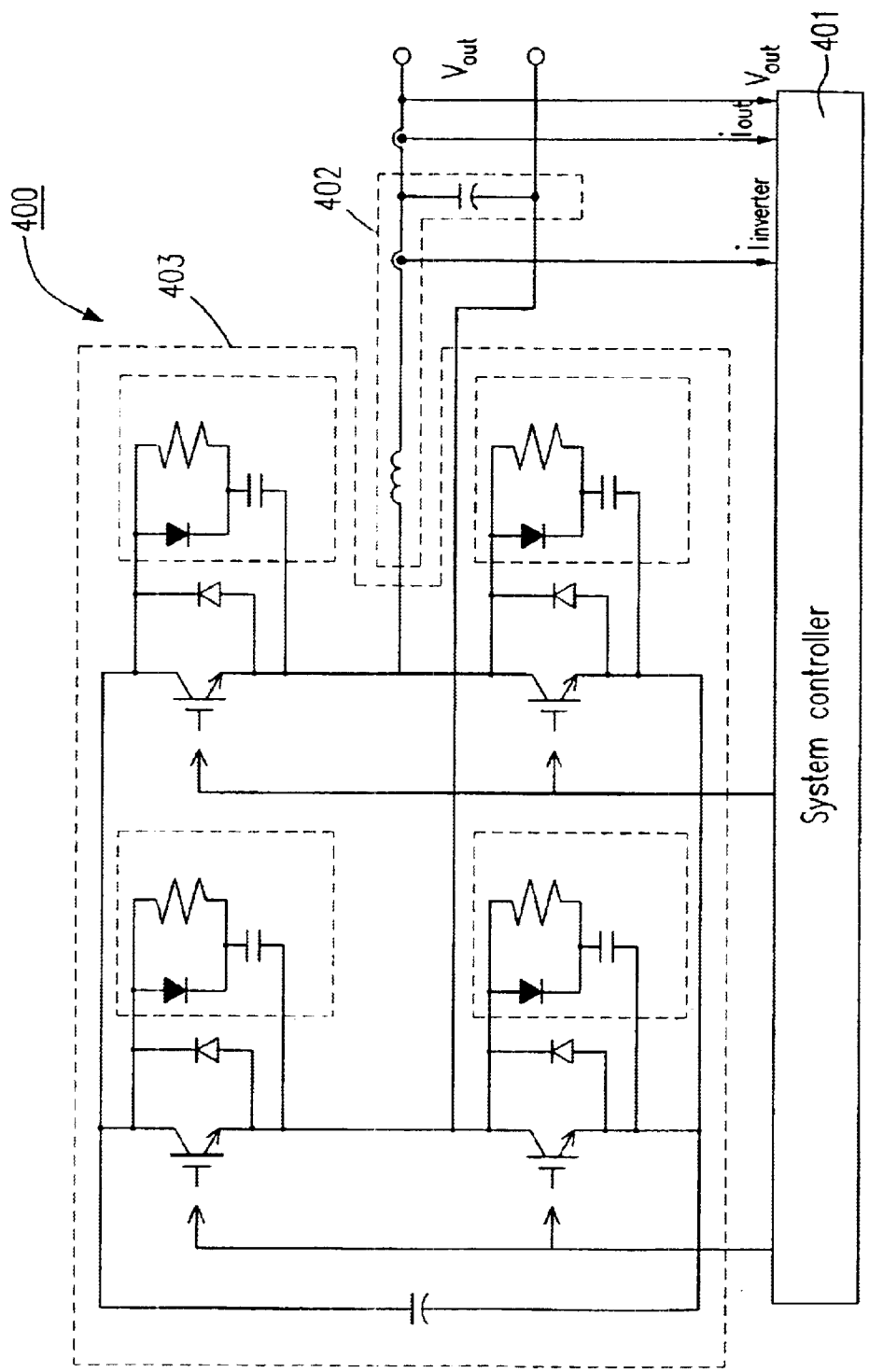
FIG. 3(b) is a schematic diagram illustrating a DC-to-AC power inverter according to another preferred embodiment of the present invention.

FIG. 3(b) is a schematic diagram illustrating a DC-to-AC power inverter according to another preferred embodiment of the present invention. The difference between FIG. 3(a) and FIG. 3(b) is that the switching circuit in FIG. 3(a) is a half-bridge circuit and the switching circuit in FIG. 3(b) is a full-bridge circuit.

Owing to the above descriptions, the present invention provides a power supply apparatus and a method of operation thereof for applying to an active power line conditioner, a voltage-mode active power filter, and an uninterruptible power supply. There are many advantages as described in the following:

(1) In the controller system of the present invention, it needs not to use a multiplier module and a RMS voltage calculation module that computes an RMS voltage $V_{rms}$. Therefore, the complexity of the controller circuit in the present invention can be reduced.

(2) The present invention adopts the feedback control of the output inductor current to stabilize the output voltage. This method can avoid the regulation precision of the power inverter influenced by the variation of the output filter capacitor.

(3) The present invention adopts a load current feedforward control technique to increase the bandwidth and the regulation precision of the power inverter.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A DC-to-AC power inverter, comprising:
   an input port;
   an output port;
   a switching circuit electrically connected between said input port and said output port responsive to control signals to convert a DC voltage at said input port to an AC output voltage; and
   a system controller for sensing said AC output voltage at said output port and transforming said AC output voltage to generate a first reference current signal, for sensing an output current at said output port to generate an output current signal, for generating a reference current signal by adding said first reference current signal to said output current signal, and for generating said control signals responsive to said reference current signal and a sensed inverter current signal by sensing an inverter current at said switching circuit.

2. The DC-to-AC power inverter according to claim 1, wherein said system controller comprises:

an inverter current sensor coupled to said switching circuit for sensing said inverter current at said switching circuit to generate said inverter current signal;

an output current sensor for sensing said output current at said output port to generate said output current signal;

a voltage control circuit coupled to said output port and said output current sensor for generating said reference current signal responsive to said output current signal and said sensed output voltage signal; and a current mode control circuit coupled to said voltage control circuit to generate said control signals responsive to said first reference current signal.

3. The DC-to-AC power inverter according to claim 2, wherein said voltage control circuit comprises:

a voltage sensor coupled to said output port for sensing said AC output voltage to generate said output voltage signal;

a subtractor received said output voltage signal and a reference voltage signal for generating an error voltage signal by subtracting said output voltage signal from said reference voltage signal;

a voltage controller coupled to said subtractor for transforming said error voltage signal to said first reference current signal; and an adder coupled to said voltage controller and said output current sensor for generating said reference current signal responsive to said first reference current signal and said output current signal.

4. A control method for a DC-to-AC power inverter, wherein said DC-to-AC power inverter comprises an input port, an output port, a switching circuit electrically connected between said input port and said output port responsive to control signals to convert a DC voltage at said input port to an AC output voltage, comprising the steps of:

sensing said AC output voltage at said output port and transforming said AC output voltage to generate a first reference current signal;

sensing an output current at said output port to generate an output current signal;

generating a reference current signal by adding said first reference current signal to said output current signal; and generating said control signals responsive to said reference current signal and a sensed inverter current signal by sensing an inverter current at said switching circuit.

5. The control method according to claim 4, wherein said control method further comprises the steps of:

sensing said inverter current at said switching circuit to generate said inverter current signal;

sensing said output current at said output port to generate said output current signal;

generating said first reference current signal responsive to said output current signal and said sensed output voltage signal; and generating said control signals responsive to said first reference current signal.

6. The control method according to claim 5, wherein said control method further comprises the steps of:

sensing said AC output voltage to generate said output voltage signal;

generating an error voltage signal by subtracting said output voltage signal from said reference voltage signal;

transforming said error voltage signal to said first reference current signal; and generating said reference current signal responsive to said first reference current signal and said output current signal.

* * * * *